United States Patent
Zheng

(10) Patent No.: US 11,595,591 B2
(45) Date of Patent: Feb. 28, 2023

(54) METHOD AND APPARATUS FOR TRIGGERING SPECIAL IMAGE EFFECTS AND HARDWARE DEVICE

(71) Applicant: BEIJING BYTEDANCE NETWORK TECHNOLOGY CO., LTD., Beijing (CN)

(72) Inventor: Wei Zheng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/459,739

(22) Filed: Aug. 27, 2021

(65) Prior Publication Data

US 2021/0392276 A1    Dec. 16, 2021

Related U.S. Application Data

(63) Continuation of application No. PCT/CN2019/128744, filed on Dec. 26, 2019.

(30) Foreign Application Priority Data

Feb. 28, 2019  (CN) .......................... 201910151013.1

(51) Int. Cl.
  *H04N 5/262*  (2006.01)
  *G10L 15/22*  (2006.01)
  *H04N 5/232*  (2006.01)

(52) U.S. Cl.
  CPC ............ *H04N 5/262* (2013.01); *G10L 15/22* (2013.01); *H04N 5/23229* (2013.01); *H04N 5/2621* (2013.01); *G10L 2015/223* (2013.01)

(58) Field of Classification Search
  None
  See application file for complete search history.

(56) References Cited

U.S. PATENT DOCUMENTS 10,015,546 B1    7/2018  Petty
2016/0358620 A1*  12/2016  Hammersley ............ A63H 5/00
(Continued)

FOREIGN PATENT DOCUMENTS

CN    104756185 A    7/2015
CN    104780338 A    7/2015
(Continued)

OTHER PUBLICATIONS

International Patent Application No. PCT/CN2019/128744; Int'l Search Report; dated Mar. 27, 2020; 2 pages.

*Primary Examiner* — Heather R Jones
(74) *Attorney, Agent, or Firm* — BakerHostetler

(57) ABSTRACT

The disclosure discloses a method and apparatus for triggering special image effects and a hardware device. The method for triggering special image effects comprises: acquiring an original image from an image source and displaying the original image on a display device; collecting speech in an environment and recognizing the semantics of said speech; triggering a special effects process in response to recognizing predetermined semantics of said speech, the predetermined semantics being preset semantics associated with one or more special effects process; and according to the triggered special effects process, processing the original image to form and display special image effects. According to the method for triggering special image effects in the embodiment of the present disclosure, the image processing effect is triggered by recognition of speech semantics, thereby solving the technical problem in the prior art of inflexible image effect triggering being unable to free up a user's hands.

17 Claims, 3 Drawing Sheets

(56) References Cited

U.S. PATENT DOCUMENTS

2019/0189019 A1\* 6/2019 Hammersley .......... G06N 20/00
2020/0177823 A1\* 6/2020 Zhu .................... G06K 9/00248
2021/0183378 A1\* 6/2021 Gharpure ................ G06F 3/016

FOREIGN PATENT DOCUMENTS

| CN | 104780459 | A | | 7/2015 | |
|----|-----------|---|---|--------|---|
| CN | 105872838 | A | | 8/2016 | |
| CN | 106339201 | A | | 1/2017 | |
| CN | 106791370 | A | | 5/2017 | |
| CN | 107820017 | A | \* | 3/2018 | ......... H04N 5/23216 |
| CN | 107820017 | A | | 3/2018 | |
| CN | 108363557 | A | | 8/2018 | |
| CN | 207867892 | U | | 9/2018 | |
| CN | 108986017 | A | | 12/2018 | |
| WO | WO-2019168920 | A1 | \* | 9/2019 | ............... A63F 1/06 |

\* cited by examiner

METHOD AND APPARATUS FOR TRIGGERING SPECIAL IMAGE EFFECTS AND HARDWARE DEVICE

CROSS-REFERENCE TO RELATED APPLICATIONS

The present application is a continuation application of International Patent Application No. PCT/CN2019/128744, titled "METHOD AND APPARATUS FOR TRIGGERING SPECIAL IMAGE EFFECTS AND HARDWARE DEVICE", filed on Dec. 26, 2019, which claims priority to Chinese Patent Application No. 201910151013.1, titled "METHOD AND APPARATUS FOR TRIGGERING SPECIAL IMAGE EFFECTS AND HARDWARE DEVICE", filed on Feb. 28, 2019 with the China National Intellectual Property Administration (CNIPA), both of which are incorporated herein by reference in their entireties.

FIELD

The present disclosure relates to the field of image processing, and in particular to a method and an apparatus for triggering an image effect, and a hardware device.

BACKGROUND

With the development of computer technology, intelligent terminals have been widely used. For example, intelligent terminals are used to listen to music, play games, chat on-line, take photos, etc. Regarding photo taking, current intelligent terminals may have cameras with ten millions pixels, which can realize high resolution and good effects comparable to professional cameras.

At present, when taking photos with an intelligent terminal, not only the built-in camera software can be used to achieve conventional functions of the camera, but also applications (usually referred to as APP) downloaded from network can be used to achieve additional image or video effects, such as various filter effects.

However, in the conventional technology, a user has to manually select an effect, such as a sticker or a filter, to add the effect, which is inconvenient, especially when the user's hands are not available. That is, the conventional technology cannot free the user's hands.

SUMMARY

According to an aspect of the present disclosure, a method for triggering a special image effect is provided.

The method includes: acquiring an original image from an image source and displaying the original image on a display device; collecting a speech in surroundings and recognizing semantics of the speech; triggering a special effect process in response to that predetermined semantics is recognized from the speech, the predetermined semantics being preset to be associated with at least one special effect process; and processing the original image by the triggered special effect process to generate and display an image effect.

In a further embodiment, the acquiring an original image from an image source and displaying the original image on a display device includes: acquiring, by an image acquisition device, an image or video and displaying the image or video on the display device.

In a further embodiment, the collecting a speech in surroundings and recognizing semantics of the speech includes: collecting the speech in surroundings in response to a first triggering signal; and recognizing semantics of the speech.

In a further embodiment, the first triggering signal includes any one of: a signal generated by a touch at a predetermined position on a screen of a terminal device; and a signal generated in response to that a predetermined event is recognized from the original image.

In a further embodiment, before the collecting a speech in surroundings and recognizing semantics of the speech, the method further includes: loading a special effect package and parsing the special effect package to obtain the predetermined semantics for triggering a special effect in the special effect package.

In a further embodiment, the collecting a speech in surroundings and recognizing semantics of the speech includes: collecting speech data from surroundings; converting the speech data into text data; and performing word segmentation on the text data to obtain at least one piece of semantics.

In a further embodiment, the triggering a special effect process in response to that predetermined semantics is recognized from the speech, the predetermined semantics being preset to be associated with at least one special effect process, includes: comparing the semantics recognized from the speech with the predetermined semantics; and acquiring a processing parameter of the special effect process corresponding to the predetermined semantics, if the predetermined semantics is contained in the semantics recognized from the speech, the predetermined semantics being preset to be corresponding to the at least one special effect process.

In a further embodiment, the processing the original image by the triggered special effect process to generate and display a special image effect includes: processing the original image based on the processing parameter to generate the image effect, and displaying the special image effect on the display device.

In a further embodiment, the special effect process includes one or more of filter processing, deformation processing, sticker processing, and animation processing.

In a further embodiment, before the collecting a speech in surroundings and recognizing semantics of the speech, the method further includes: setting a sampling frequency and a sampling resolution for speech collecting.

In a further embodiment, before the triggering a special effect process in response to that predetermined semantics is recognized from the speech, the method further includes: setting correspondence between the predetermined semantics and an image effect, the special image effect including the at least one special effect process required for generating the special image effect.

According to another aspect of the present disclosure, an apparatus for triggering a special image effect is provided. The apparatus includes: an original image acquisition module configured to acquire an original image; a semantic recognition module configured to collect a speech in surroundings and recognize semantics of the speech; a special effect process triggering module configured to trigger a special effect process in response to that predetermined semantics is recognized from the speech, the predetermined semantics being preset to be associated with at least one special effect process; and a special image effect generation module configured to process the original image by the triggered effect process to generate the special image effect.

In a further embodiment, the original image acquisition module is further configured to: acquire, by an image acquisition device, an image or video and display the image or video on the display device.

In a further embodiment, the semantic recognition module further includes: a speech collecting module configured to collect the speech in surroundings in response to a first triggering signal; and a first semantic recognition module configured to recognize semantics of the speech.

In a further embodiment, the first triggering signal includes any one of: a signal generated by a touch at a predetermined position on a screen of a terminal device; and a signal generated in response to that a predetermined event is recognized from the original image.

In a further embodiment, the apparatus further includes a special effect package loading and parsing module configured to load a special effect package and parse the special effect package to obtain the predetermined semantics for triggering a special effect in the special effect package.

In a further embodiment, the semantic recognition module further includes: a speech data collecting module configured to collect speech data from surroundings; a speech data converting module configured to convert the speech data into text data; and a second semantic recognition module configured to perform word segmentation on the text data to obtain at least one piece of semantics.

In a further embodiment, the special effect process triggering module further includes a processing parameter acquisition module configured to: compare the semantics recognized from the speech with the predetermined semantics; and acquire a processing parameter of the special effect process corresponding to the predetermined semantics, if the predetermined semantics is contained in the semantics recognized from the speech, the predetermined semantics being preset to be corresponding to the at least one special effect process.

In a further embodiment, the special image effect generation module is further configured to: process the original image based on the processing parameter to generate the image effect, and display the special image effect on the display device.

In a further embodiment, the special effect process includes one or more of filter processing, deformation processing, sticker processing, and animation processing.

In a further embodiment, the apparatus further includes a sample setting module configured to set a sampling frequency and a sampling resolution for speech collecting.

In a further embodiment, the apparatus further includes a correspondence setting module configured to set correspondence between the predetermined semantics and the image effect, the special image effect including the at least one effect process required for generating the image effect. According to yet another aspect of the present disclosure, an electronic device is provided.

The device includes: a memory configured to store non-transient computer readable instructions; and a processor configured to execute the computer readable instructions to perform steps of any of the above methods for triggering an image effect.

According to yet another aspect of the present disclosure, a computer readable storage medium is provided.

The computer readable storage medium is configured to store non-transient computer readable instructions. The non-transient computer readable instructions, when executed by a computer, cause the computer to perform steps of any of the methods described above.

A method and an apparatus for triggering an image effect, and a hardware device, are provided according to the present disclosure. The method for triggering a special image effect includes: acquiring an original image from an image source and displaying the original image on a display device; collecting a speech in surroundings and recognizing semantics of the speech; triggering a special effect process in response to that predetermined semantics is recognized from the speech, the predetermined semantics being preset to be associated with at least one special effect process; and processing the original image by the triggered special effect process to generate and display an image effect. In the method for triggering a special image effect according to the embodiments of the present disclosure, a special image effect is triggered through recognition of speech semantics, which solves the technical problems in conventional technology that the triggering of image effects is inflexible and relies on the user's hand.

The above description is merely an overview of the technical solutions of the present disclosure. Some preferred embodiments are described hereinafter in conjunction with drawings in order for a clearer understanding of the technical means of the present disclosure to implement the technical solutions, and to make the above and other objectives, features and advantages of the present disclosure clearer and easier to understand.

DETAILED DESCRIPTION

Embodiments of the present disclosure are described hereinafter with specific examples. Those skilled in the art can easily understand other advantages and effects of the present disclosure from the content disclosed in this specification. Apparently, the described embodiments are only some of the embodiments of the present disclosure, rather than all of the embodiments. The present disclosure can also be implemented or applied through other embodiments. Besides, details in the specification can be modified or alternated based on different viewpoints and applications, without departing from the spirit of the present disclosure. It is to be noted that, the embodiments of the present disclosure and features in the embodiments may be combined with each other if not causing conflicts. Based on the embodiments of the present disclosure, all other embodiments obtained by those skilled in the art without any creative effort shall fall within the scope of protection of the present disclosure.

It is to be noted that, various aspects of the embodiments within the scope of the appended claims are described below. It is obvious that the aspects described herein can be embodied in a variety of forms, and any specific structure and/or function described herein are only illustrative. Based on the present disclosure, those skilled in the art should understand that an aspect described herein can be implemented independently from any other aspects, and two or more of these aspects can be combined in various ways. For example, any number of aspects set forth herein can be used to implement devices and/or to practice methods. In addition, other structures and/or functionalities other than one or more of the aspects set forth herein may be used to implement the device and/or to practice the method.

It is to be noted that, the drawings illustrated with the following embodiments are only intended to illustrate the basic concepts of the present disclosure by way of example. The drawings only show the components related to the present disclosure, and the components are not necessarily drawn as the actual quantity, shape and scale adopted in practice. The actual form, quantity and proportion of each component can be adjusted as desired in an actual implementation, in which the components may be arranged even more complicated.

Furthermore, details in the following description are provided for a purpose of a thorough understanding of the embodiments. However, it is to be understood by those skilled in the art that an aspect of the present disclosure may be practiced without these details.

Figure 1:
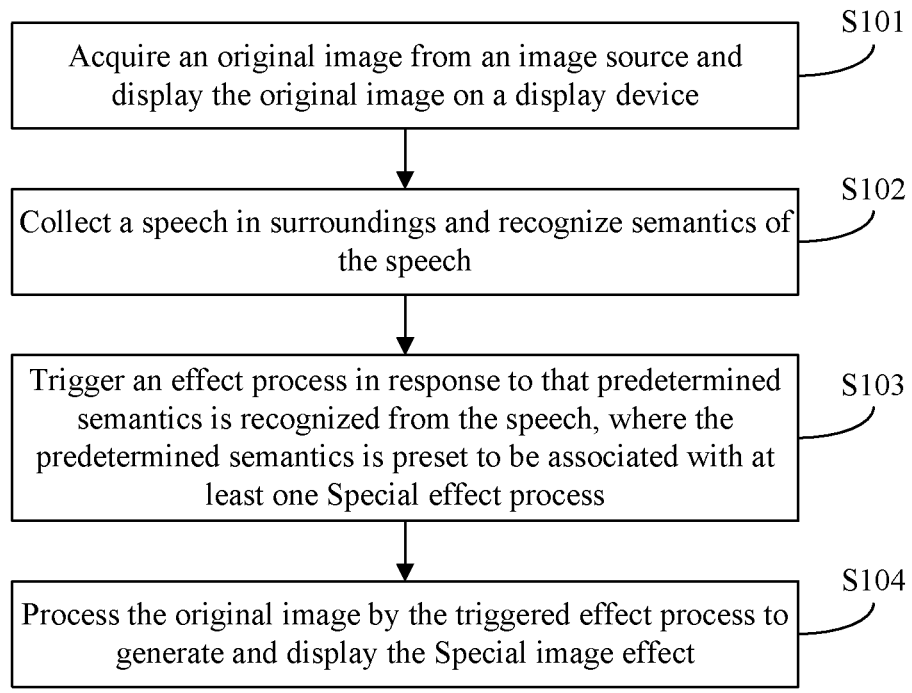
FIG. 1 is a schematic flow chart showing a method for triggering a special image effect according to an embodiment of the present disclosure.

A method for triggering a special image effect is provided according to the present disclosure. The method may be performed by computing means, which may be implemented as software, or as a combination of software and hardware. The computing means may be integrated into a server, a terminal device or the like. As shown in FIG. 1, the method for triggering a special image effect includes the following steps S101 to S104.

In step S101, an original image is acquired from an image source and displayed on a display device.

In an embodiment, the image source may be various image sensors. The step of acquiring an original image from an image source may include acquiring the original image through an image sensor. An image sensor is a device that can acquire images. A typical image sensor may be a camcorder, a camera, and the like. In the embodiment, the image sensor may be a camera installed on a terminal device, such as a front or rear camera on a smart phone, and images collected by the camera may be directly displayed on the display screen of the smart phone.

In an embodiment, the step of acquiring an original image from an image source may include acquiring a current image frame of a video collected by the terminal device. A video is composed of multiple image frames. Video images are acquired in the embodiment and a frame of image in the video images is used as the original image. The step of acquiring an original image may alternatively be acquiring a picture collected by the terminal device.

In an embodiment, the image source is a local storage or a storage in a network. The step of acquiring an original image from an image source may be acquiring an image in any form from a local storage or a storage indicated by a network address. The image may be, for example, a static picture, a dynamic picture or a video in any format, which is not limited herein.

In the step, the acquired original image is then displayed on a display device. The display device may be a display screen of a terminal or a server that performs the method for triggering an image effect, or a display screen of a terminal or server that receives the original image.

In step S102, a speech in surroundings is collected and semantics of the speech is recognized.

Figure 2:
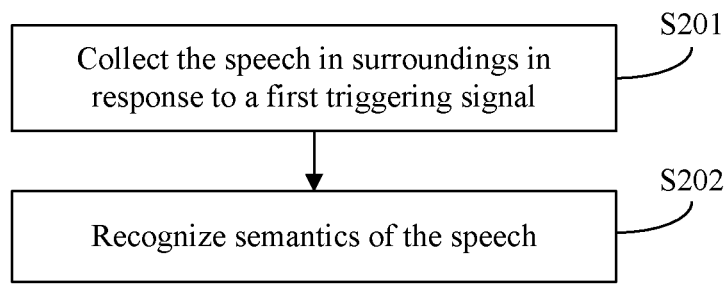
FIG. 2 is a schematic flow chart showing step S102 of the method for triggering a special image effect according to an embodiment of the present disclosure.

As shown in FIG. 2, according to an implementation, the step of collecting a speech in surroundings and recognizing semantics of the speech may include step S201 of collecting a speech in surroundings in response to a first triggering signal, and step S202 of recognizing semantics of the speech. In an embodiment, the first triggering signal is triggered under a certain condition. For example, the first triggering signal instructing a terminal device to start collecting a speech in surroundings may be generated when the user opens a special effect application and selects a specific effect package. The special effect package is usually presented as an interface on the screen, such as a button or icon at a predetermined position, so that the first triggering signal is generated by a touch at the predetermined position on the screen of the terminal device. Alternatively, the first triggering signal instructing a terminal device to start collecting a speech in surroundings can be generated when a predetermined event, such as a human face, is recognized from the original image. It is to be understood that, the above manners are only examples, and generation of the first triggering signal is not limited to the above manners. In practical applications, the triggering signal for collecting a speech in surroundings may be set in any appropriate manner, which is not described in details herein.

In an embodiment, before collecting the speech in surroundings, the method may further include loading a special effect package and parsing the special effect package to obtain semantics for triggering a special effect in the effect package. In the embodiment, the first triggering signal may be generated through a touch at a predetermined position on the screen of the terminal device. Particularly, the first triggering signal may be generated when a user touches an icon of the special effect package. In this case, before collecting the speech in surroundings, a special effect package may be loaded and parsed to obtain the semantics for triggering a special effect contained in the special effect package. In an embodiment, the special effect package may include various effects, which may be triggered by different semantics. For example, semantics of "happy" and "new year" may be recognized from a speech "happy new year". The semantics "happy" may correspond to a smiling face effect in the special effect package, and the semantics "new year" may correspond to a firecracker effect in the effect package.

Figure 3:
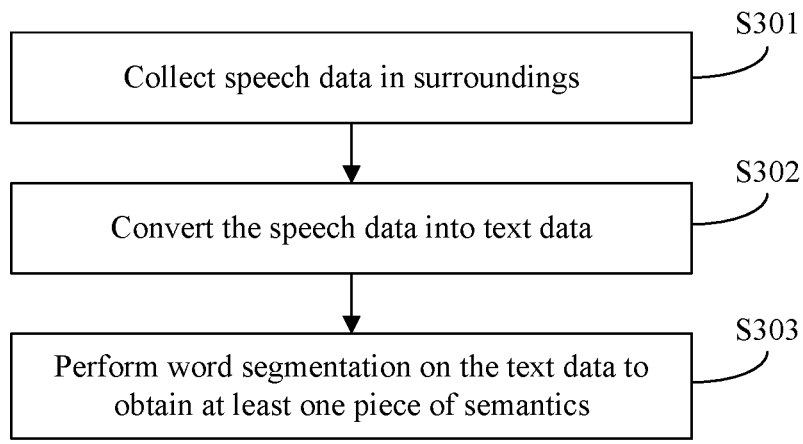
FIG. 3 is a schematic flow chart showing step S102 of the method for triggering a special image effect according to another embodiment of the present disclosure.

As shown in FIG. 3, in an embodiment of step S102, the step of collecting a speech in surroundings and recognizing semantics of the speech includes step S301 of collecting speech data from surroundings, step S302 of converting the speech data into text data, and step S303 of performing word segmentation on the text data to obtain at least one piece of semantics. To collect the speech in surroundings, a sound collection device is required. A typical sound collection device may be a microphone. The speech collected through the sound collection device is a continuous analog signal, which may be sampled to generate a PCM (Pulse Code Modulation) signal. In another embodiment, before collecting the speech in surroundings and recognizing semantics of the speech, the method may include a step of setting a sampling frequency and a sampling resolution for speech collecting. Typically, the sampling frequency and the sampling resolution may be 44.1 KHz and 16 bit, 16 KHz and 16 bit, or may be less appropriately in consideration of performance, transmission rate or other factors. The sampling frequency and the sampling resolution in practical applications are not limited to the above examples and are not set forth herein in details.

After being collected, the speech data is converted into text data. In an embodiment, the speech data are preprocessed for an accuracy conversion. Typically, a preprocessing may include converting the speech data into an audio file in a certain format, such as WAV (Waveform Audio File Format), FLAC (Free Lossless Audio Codec), etc. The preprocessing may include noise suppression. The speech data may be collected in accompany with other sounds in surroundings. In order to reduce the interference from environmental noise, it is necessary to perform noise reduction on the speech data. The preprocessing may include lossless compression. If the apparatus for speech recognition is an online device, the speech data needs to be transmitted from a local apparatus to the online device for recognition. Lossless compression may help to reduce volume of the speech data, save network resources and reduce transmission time of the speech data, so that the speech recognition may be completed quickly. The aforementioned format conversion, noise suppression, and lossless compression on the speech data may be performed by any methods, which is not specifically limited in the present disclosure. After preprocessing, the speech data is input into the speech recognition device so that the speech is converted into text data. In the step, speech features may be extracted from the speech data and compared with speech features from a speech template. Text data of any matched speech is then output as the text data of the speech data. It is to be understood that the above method of converting the speech into text is only provided as an example, and various other methods, such as deep learning, may be used to convert the speech into text.

When the text data of the speech is obtained, word segmentation may be performed on the text data to obtain at least one piece of semantics. The word segmentation may be performed differently based on demands. For example, text "happy new year" may be determined as one piece of semantics, or may be segmented into two pieces of semantics of "happy" and "new year".

It is to be understood that the method for recognizing semantics of the speech in step S102 may be implemented in any way. For example, the speech data may be input into a recognition model to directly recognize required semantics through the model. Besides, this step may output only semantics that is able to trigger an special effect in the above-mentioned special effect package. Semantics that cannot trigger any special effect in the special effect package is not necessarily to be recognized. In this case, the recognition model may be trained so that it can only recognize predetermined semantics, rather than all semantics. The semantics may include words with similar meanings. For example, "new year" and "the Spring Festival" may be recognized as the same semantics. This may be realized by synonymous speech templates or by training models, which is not described in details herein.

It is to be understood that the step may be performed locally or in an online manner, that is, the recognition system for semantics of speech may be arranged locally or in an online manner. The system may be differently arranged for different application scenarios, which is not limited in the present disclosure.

In step S103, a special effect process is triggered in response to that predetermined semantics is recognized from the speech, where the predetermined semantics is preset to be associated with at least one special effect process.

In the step, the predetermined semantics is a semantics preset to trigger an effect. If the previous steps include steps of loading a special effect package and parsing the special effect package to obtain semantics for triggering a special effect in the special effect package, the predetermined semantics is the semantics obtained by the parsing step.

In an embodiment, the triggering a special effect process in response to that predetermined semantics is recognized from the speech includes: comparing the semantics recognized from the speech with the predetermined semantics; and acquiring a processing parameter of the special effect process corresponding to the predetermined semantics, if the predetermined semantics is contained in the semantics recognized from the speech. The predetermined semantics is semantics preset to be corresponding to the at least one special effect process. The parameter for the special effect process corresponding to the predetermined semantics is acquired if the predetermined semantics is included in the semantics recognized from the speech. In the embodiment, the semantics may include multiple semantics. In an example, a user speech "wish you a happy new year" may be recognized in step S102 as having semantics of "wish", "you", "happy" and "new year". If the predetermined semantics is "new year", the predetermined semantics is contained in the recognized semantics, and thus the method proceeds to the next step. If the predetermined semantics is "eat", the method does not proceed to the next step. In the embodiment, when the predetermined semantics is included in the obtained semantics, the parameter for the special effect process corresponding to the predetermined semantics is acquired. The special effect process may be one or more of filter processing, deformation processing, sticker processing, and animation processing. The special effect process corresponding to the predetermined semantics may be acquired from the special effect package. Specifically, correspondence between semantics and effects may be obtained by parsing the special effect package. Each special effect also corresponds to one or more special effect process, so that the semantics is associated with the effects. It is to be understood that the parameter for a special effect process may include a type of the special effect process, and resources and characteristic parameters required for performing the special effect process. For example, in sticker processing, the type is "sticker", the resource is a picture or a frame used for a sticker, and the characteristic parameters includes a display position of the sticker, display time of the sticker and the like.

It is understood that the special effect process is not limited to the above examples. Any special effect process may be used in the present disclosure. The processing parameter of the special effect process is not limited to the above, and is not specifically limited herein.

In step S104, the original image is processed by the triggered special effect process, to generate and display an image effect.

After the special effect process corresponding to the predetermined semantics is acquired, the original image is processed based on the parameter for the special effect process so as to generate an image effect. Take animation processing as an example, when semantics of "new year" is recognized from a user speech "wish you a happy new year", and if "new year" is contained in the predetermined semantics of the special effect package, the animation processing in the special effect package is triggered and the original image may be processed by adding an animation of lighting firecrackers at a predetermined position of the original image, and playing a background sound of firecrackers, to obtain an image with an animated special effect of firecracker. Taking filter processing as another example, when semantics of "good looking" is recognized from a user speech "How good looking I am" and is contained in the predetermined semantics of the special effect package, a beauty filter in the special effect package may be triggered and a human face in the original image may be processed by the beauty filter to obtain an image of a beautified face. After being generated, the special image effect is displayed on a display device. The display device may be a display screen of a terminal or a server that performs the method for triggering an image effect, or a display screen of a terminal or a server that receives the effected image, etc.

Figure 4:
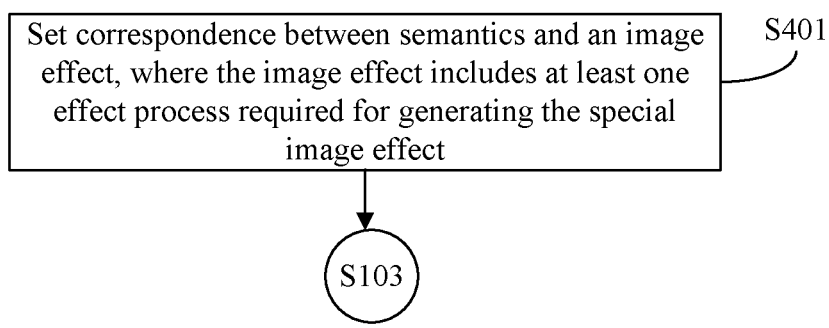
FIG. 4 is a schematic flow chart showing an additional step of the method for triggering a special image effect according to yet another embodiment of the present disclosure.

In order to improve flexibility, the method further includes step S401 before step S103, as shown in FIG. 4. In step S401, correspondence between semantics and the special image effect is set, the special image effect including special effect process required for generating the image effect. The step S401 may be performed in generating the special effect package. That is, the condition for triggering the special image effect may be set by setting the correspondence between the semantics and one or more image effects in the special effect package. It is to be understood that the correspondence may be stored in a profile of the special effect package. The profile of the special effect package may further include a special image effect contained in the special effect package, the storage location of materials contained in the image effect, special effect process required for the image effect, a processing parameter for the special effect process, and the like. The profile may be used to configure any attribute of the special effect in the special effect package, such as the display position of the effect, display time of the effect, display mode of the effect, and processing degree of the effect, which is not listed completely herein. In addition, in order to improve the flexibility for users, the correspondence between the semantics and the image effects may be defined by a user while using. In this case, the user may record a speech and set semantics of the speech as a triggering condition for an image effect.

A method and an apparatus for triggering an image effect, and a hardware device, are provided according to the present disclosure. The method for triggering a special image effect includes: acquiring an original image from an image source and displaying the original image on a display device; collecting a speech in surroundings and recognizing semantics of the speech; triggering a special effect process in response to that predetermined semantics is recognized from the speech, the predetermined semantics being preset to be associated with at least one special effect process; and processing the original image by the triggered special effect process to generate and display an image effect. In the method for triggering an image special effect according to the embodiments of the present disclosure, a special image effect is triggered through recognition of speech semantics, which solves the technical problems in conventional technology that the triggering of image effects is inflexible and relies on the user's hand.

Although the steps of the method embodiments are described in the above order, those skilled in the art should understand that the steps according to the embodiments of the present disclosure are not necessarily executed in the above order, and they may be performed in a reversed, parallel, interleaved manner or other orders. Besides, on the basis of the above steps, those skilled in the art may add other steps. These obvious modifications or equivalents shall fall within the protection scope of the present disclosure, and are not repeated hereinafter.

The apparatus embodiments according to the present disclosure are described below. The apparatus embodiments can perform the steps of the method embodiments of the present disclosure. For ease of description, only the parts related to the embodiments of the present disclosure are shown. For specific technical details that are not disclosed, one may refer to the method embodiments of the present disclosure.

Figure 5:
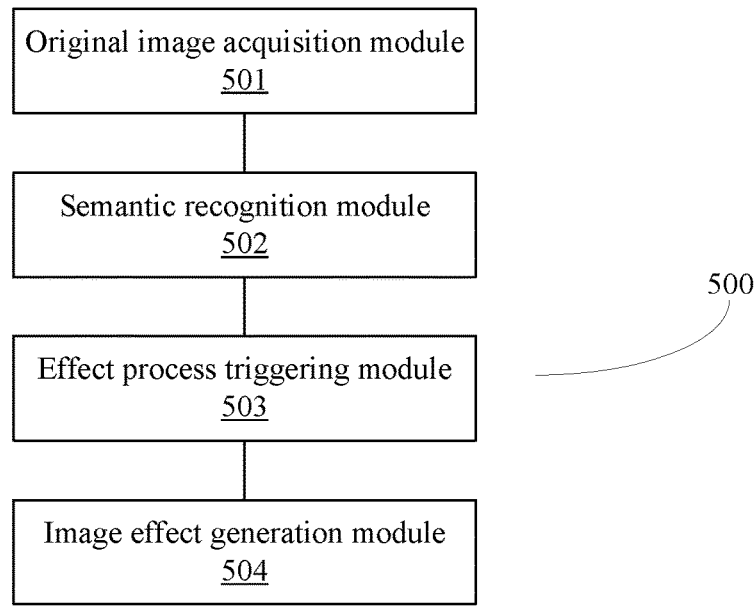
FIG. 5 is a schematic structural diagram of an apparatus for triggering a special image effect according to an embodiment of the present disclosure.

An apparatus for processing an image is provided according to an embodiment of the present disclosure. The apparatus is configured to perform the steps of the method for triggering an image effect. As shown in FIG. 5, the apparatus 500 includes an original image acquisition module 501, a semantic recognition module 502, a special effect process triggering module 503, and a special image effect generation module 504.

The original image acquisition module 501 is configured to acquire an original image from an image source and display the original image on a display device.

The semantic recognition module 502 is configured to collect a speech in surroundings and recognize semantics of the speech.

The special process triggering module 503 is configured to trigger a special effect process in response to that predetermined semantics is recognized from the speech, the predetermined semantics being preset to be associated with at least one special effect process.

The special image effect generation module 504 is configured to process the original image by the triggered special effect process to generate and display the image effect.

In a further embodiment, the original image acquisition module 501 is further configured to acquire, by an image acquisition device, an image or video and display the image or video on the display device.

In a further embodiment, the semantic recognition module 502 further includes: a speech collecting module configured to collect the speech in surroundings in response to a first triggering signal; and a first semantic recognition module configured to recognize semantics of the speech.

In a further embodiment, the first triggering signal includes any one of: a signal generated by a touch at a predetermined position on a screen of a terminal device; and a signal generated in response to that a predetermined event is recognized from the original image.

In a further embodiment, the apparatus 500 further includes a special effect package loading and parsing module configured to load a special effect package and parse the special effect package to obtain the predetermined semantics for triggering a special effect in the special package.

In a further embodiment, the semantic recognition module 502 further includes: a speech data collecting module configured to collect speech data from surroundings; a speech data converting module configured to convert the speech data into text data; and a second semantic recognition module configured to perform word segmentation on the text data to obtain at least one piece of semantics.

In a further embodiment, the special effect process triggering module 503 further includes a processing parameter acquisition module configured to: compare the semantics recognized from the speech with the predetermined semantics; and acquire a processing parameter of the special effect process corresponding to the predetermined semantics, if the predetermined semantics is contained in the semantics recognized from the speech, the predetermined semantics being preset to be corresponding to the at least one special effect process.

In a further embodiment, the special image effect generation module 504 is further configured to: process the original image based on the processing parameter to generate the image effect, and display the special image effect on the display device.

In a further embodiment, the special effect process includes one or more of filter processing, deformation processing, sticker processing, and animation processing.

In a further embodiment, the apparatus 500 may further include a sample setting module configured to set a sampling frequency and a sampling resolution for speech collecting.

In a further embodiment, the apparatus 500 may further include a correspondence setting module configured to set correspondence between the predetermined semantics and the image effect, the special image effect including the at least one special effect process required for generating the image effect.

The apparatus shown in FIG. 5 may be used to execute the methods according to the embodiments shown in FIGS. 1 to 4. For the parts not described in detail in the apparatus embodiments, one may refer to description of the embodiments in FIGS. 1 to 4. For implementation process and technical effects of the technical solution for the apparatus, one may refer to the description of the embodiment shown in FIGS. 1 to 4, which are not repeated hereinafter.

Figure 6:
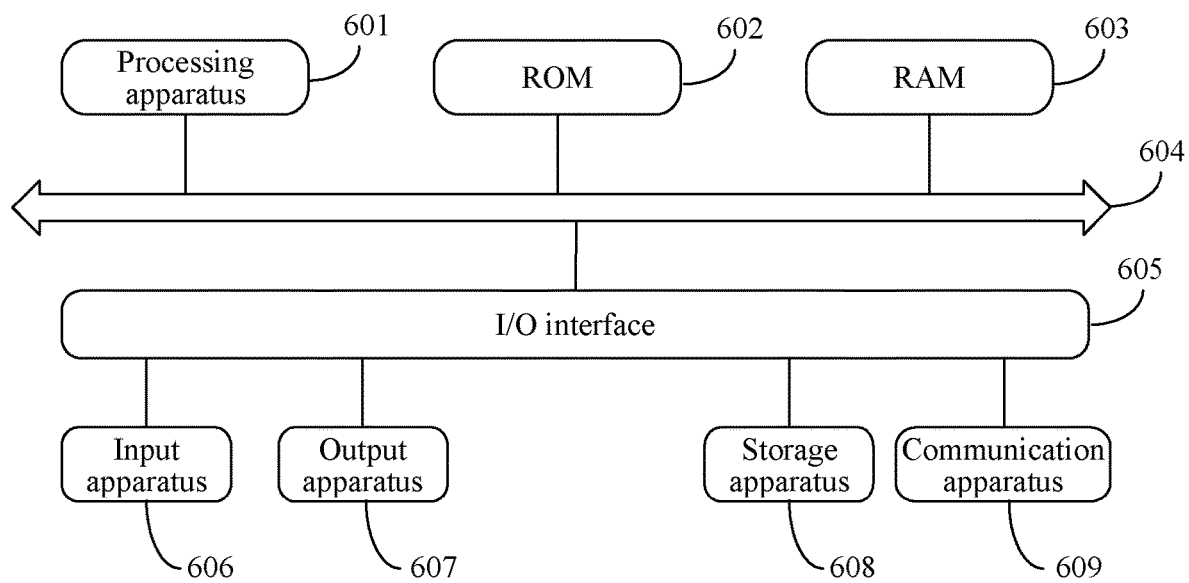
FIG. 6 is a schematic structural diagram of an electronic device according to an embodiment of the present disclosure.

FIG. 6 shows a schematic structural diagram of an electronic device 600 suitable for implementing the embodiments of the present disclosure. The electronic devices according to the embodiments of the present disclosure may include, but are not limited to, mobile terminals, such as mobile phones, laptops, digital broadcast receivers, PDAs (personal digital assistants), PADs (tablet PCs), PMPs (portable multimedia players), vehicle-mounted terminals (such as in-vehicle navigation terminals) and the like, and fixed terminals such as digital TVs, desktop computers, and the like. The electronic device shown in FIG. 6 is only exemplary, and should not indicate any limitation to the function and application scope of the embodiments of the present disclosure.

As shown in FIG. 6, the electronic device 600 may include a processing apparatus 601, such as a central processing unit (CPU) or a graphics processor, which may execute various operations and processing through a program stored in a Read Only Memory (ROM) 602 or a program loaded from the storage apparatus 608 into a Random Access Memory (RAM) 603. The RAM 603 is further configured to store various programs and data required by the electronic device 600. The processing apparatus 601, the ROM 602 and the RAM 603 are connected to each other through a bus 604. An Input/output (I/O) interface 605 is also connected to the bus 604.

Generally, the I/O interface 605 may be connected to: an input apparatus 606, such as a touch screen, a touch panel, a keyboard, a mouse, an image sensor, a microphone, an accelerometer, and a gyroscope; an output apparatus 607, such as a liquid crystal display (LCD), a speaker, and a vibrator; a storage apparatus 608 such as a magnetic tape and a hard disk; and a communication device 609. The communication device 609 enables wireless or wired communication between the electronic device 600 and other devices for data exchanging. Although FIG. 6 shows an electronic device 600 having various components, it should be understood that the illustrated components are not necessarily required to all be implemented or included. Alternatively, more or fewer components may be implemented or included.

Particularly, according to an embodiment of the present disclosure, the process described above in conjunction with flow charts may be implemented as a computer program. For example, a computer program product is further provided as an embodiment in the present disclosure, including a computer program carried on a computer readable medium. The computer program includes program code for performing the method shown in the flow charts. In the embodiment, the computer program may be downloaded and installed from the network via the communication device 609, or installed from the storage apparatus 608, or installed from the ROM 602. When the computer program is executed by the processing apparatus 601, the above-mentioned functions defined in the method according to the embodiment of the present disclosure are performed.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the embodiment of the present disclosure, the computer readable storage medium may be any tangible medium containing or storing a program, and the program may be used by or in combination with an instruction execution system, apparatus, or device. In the embodiment of the present disclosure, The computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable medium may be transmitted via any proper medium including but not limited to: a wire, an optical cable, radio frequency and the like, or any proper combination thereof.

The computer readable medium may be incorporated in the electronic device, or may exist alone without being assembled into the electronic device.

The computer readable medium carries one or more programs. The program, when being executed by the electronic device, cause the electronic to: acquire an original image from an image source and display the original image on a display device; collect a speech in surroundings and recognize semantics of the speech; trigger a special effect process in response to that predetermined semantics is recognized from the speech, the predetermined semantics being preset to be associated with at least one special effect process; and process the original image by the triggered special effect process to generate and display an image effect.

The computer program code for performing the operations of the embodiments of the present disclosure may be written in in one or more programming languages or combinations thereof. The programming languages includes an object-oriented programming language, such as Java, Smalltalk, C++, and a conventional procedural programming language, such as C language or similar programming language. The program code may be executed entirely on a user computer, partially on the user computer, as an independent software package, partially on the user computer and partially on a remote computer, or entirely on the remote computer or a server. In a case involving a remote computer, the remote computer may be connected to a user computer or an external computer through any kind of network including a local area network (LAN) or a wide area network (WAN). For example, the remote computer may be connected through Internet connection supported by an Internet service provider.

Flowcharts and block diagrams in the drawings illustrate the architecture, functions and operations that can be implemented by the system, method and computer program produce according to the embodiments of the present disclosure. Each block in a flowchart or a block diagram may represent a module, a program segment, or a part of code, and part of the module, program segment, or part of code contains one or more executable instructions for implementing the specified logical function. It should be noted that, in some alternative implementations, the functions marked in blocks may be performed in an order different from the order as shown in the drawings. For example, two blocks shown in succession may actually be executed in parallel, or sometimes may be executed in a reverse order, which depends on the functions involved. It is to be noted that each block in a block diagram and/or flow chart, and a combination of the blocks in a block diagram and/or flow chart, may be implemented by a dedicated hardware-based system that performs the specified functions or operations, or may be realized by a combination of dedicated hardware and computer instructions.

The units mentioned in the description of the embodiments of the present disclosure may be implemented by means of software, or otherwise by means of hardware. In some circumstances, the name of a unit does not constitute a limitation on the unit itself.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed, but not limited thereto, is also covered in the scope of the present disclosure.

The invention claimed is:

1. A method for triggering a special image effect, comprising:
acquiring an original image from an image source and displaying the original image on a display device;
loading an effect package and parsing the effect package to determine semantics of triggering at least one special effect contained in the effect package, wherein the effect package comprises a profile, and the profile of the effect package comprises information indicative of the at least one special effect, and a storage location of materials contained in the at least one special effect;
presenting an interface element corresponding to the effect package on a screen of a terminal device;
generating a triggering signal of instructing to start collecting a speech in surroundings in response to a selection of the interface element;
collecting the speech in surroundings and recognizing semantics from the speech;
setting the semantics of the collected speech as a triggering condition of the at least one special effect based on user input;
triggering the at least one special effect in response to recognizing the semantics from another speech, the semantics being preset to be associated with at least one special effect process corresponding to the at least one special effect; and
processing the original image by performing the at least one special effect process to generate and display at least one image effect.

2. The method for triggering a special image effect according to claim 1, wherein the acquiring an original image from an image source and displaying the original image on a display device comprises:
acquiring, by an image acquisition device, an image or video and displaying the image or video on the display device.

3. The method for triggering a special image effect according to claim 1, wherein the collecting a speech in surroundings and recognizing semantics of the speech comprises:
collecting the speech in surroundings in response to the triggering signal.

4. The method for triggering a special image effect according to claim 3, wherein the triggering signal comprises a signal generated by a touch at a predetermined position on the screen of the terminal device.

5. The method for triggering a special image effect according to claim 1, wherein the collecting a speech in surroundings and recognizing semantics of the speech comprises:
collecting speech data from surroundings;
converting the speech data into text data; and
performing word segmentation on the text data to obtain at least one piece of semantics.

6. The method for triggering a special image effect according to claim 1, wherein the triggering a special effect process in response to that predetermined semantics is recognized from the speech, the predetermined semantics being preset to be associated with at least one effect process, comprises:
comparing the semantics recognized from the speech with the predetermined semantics; and
acquiring a processing parameter of the special effect process corresponding to the predetermined semantics, if the predetermined semantics is contained in the semantics recognized from the speech,
wherein the predetermined semantics is preset to be corresponding to the at least one effect process.

7. The method for triggering a special image effect according to claim 6, wherein the processing the original image by the triggered special effect process to generate and display the image effect comprises:
processing the original image based on the processing parameter to generate the special image effect, and displaying the special image effect on the display device.

8. The method for triggering a special image effect according to claim 1, wherein the effect process comprises one or more of filter processing, deformation processing, sticker processing, and animation processing.

9. The method for triggering a special image effect according to claim 1, wherein before the collecting a speech in surroundings and recognizing semantics of the speech, the method further comprises:
   setting a sampling frequency and a sampling resolution for speech collecting.

10. An apparatus for triggering a special image effect, comprising:
   at least one processor; and
   a memory configured for storing at least one program, wherein
   when the at least one program is executed by the at least one processor, the at least one processor is caused to perform operations of:
   acquiring an original image from an image source and displaying the original image on a display device;
   loading an effect package and parsing the effect package to determine semantics of triggering at least one special effect contained in the effect package, wherein the effect package comprises a profile, and the profile of the effect package comprises information indicative of the at least one special effect, and a storage location of materials contained in the at least one special effect;
   presenting an interface element corresponding to the effect package on a screen of a terminal device;
   generating a triggering signal of instructing to start collecting a speech in surroundings in response to a selection of the interface element;
   collecting the speech in surroundings and recognizing semantics from the speech;
   setting the semantics of the collected speech as a triggering condition of the at least one special effect based on user input;
   triggering the at least one special effect in response to recognizing the semantics from another speech, the semantics being preset to be associated with at least one special effect process corresponding to the at least one special effect; and
   processing the original image by performing the at least one special effect process to generate and display at least one image effect.

11. The apparatus according to claim 10, wherein the acquiring an original image from an image source and displaying the original image on a display device comprises:
   acquiring, by an image acquisition device, an image or video and displaying the image or video on the display device.

12. The apparatus according to claim 10, wherein the collecting a speech in surroundings and recognizing semantics of the speech comprises:
   collecting the speech in surroundings in response to the triggering signal.

13. The apparatus according to claim 12, wherein the triggering signal comprises a signal generated by a touch at a predetermined position on the screen of the terminal device.

14. The apparatus according to claim 10, wherein the collecting a speech in surroundings and recognizing semantics of the speech comprises:
   collecting speech data from surroundings;
   converting the speech data into text data; and
   performing word segmentation on the text data to obtain at least one piece of semantics.

15. The apparatus according to claim 10, wherein the triggering a special effect process in response to that predetermined semantics is recognized from the speech, the predetermined semantics being preset to be associated with at least one effect process, comprises:
   comparing the semantics recognized from the speech with the predetermined semantics; and
   acquiring a processing parameter of the special effect process corresponding to the predetermined semantics, if the predetermined semantics is contained in the semantics recognized from the speech,
   wherein the predetermined semantics is preset to be corresponding to the at least one effect process.

16. The apparatus according to claim 15, wherein the processing the original image by the triggered special effect process to generate and display the image effect comprises:
   processing the original image based on the processing parameter to generate the special image effect, and displaying the special image effect on the display device.

17. A non-transitory computer readable storage medium, configured to store non-transient computer readable instructions, wherein the non-transient computer readable instructions, when executed by a computer, cause the computer to perform operations comprising:
   acquiring an original image from an image source and displaying the original image on a display device;
   loading an effect package and parsing the effect package to determine semantics of triggering at least one special effect contained in the effect package, wherein the effect package comprises a profile, and the profile of the effect package comprises information indicative of the at least one special effect, and a storage location of materials contained in the at least one special effect;
   presenting an interface element corresponding to the effect package on a screen of a terminal device;
   generating a triggering signal of instructing to start collecting a speech in surroundings in response to a selection of the interface element;
   collecting the speech in surroundings and recognizing semantics from the speech;
   setting the semantics of the collected speech as a triggering condition of the at least one special effect based on user input;
   triggering the at least one special effect in response to recognizing the semantics from another speech, the semantics being preset to be associated with at least one special effect process corresponding to the at least one special effect; and
   processing the original image by performing the at least one special effect process to generate and display at least one image effect.

* * * * *